United States Patent

Megy et al.

[11] Patent Number: 5,827,349
[45] Date of Patent: Oct. 27, 1998

[54] METHOD OF RECYCLING NICKEL AND COBALT ALLOY SCRAP METAL CONTAMINATED WITH TITANIUM

[76] Inventors: Joseph A. Megy, 100 N. Chester, P.O. Box 1224, New Cumberland, W. Va. 26047; Robert Rausenberger, 4006 Avenida Madera, Bradenton, Fla. 34210

[21] Appl. No.: 749,156

[22] Filed: Nov. 14, 1996

[51] Int. Cl.⁶ .......................................... C22B 3/06

[52] U.S. Cl. .................................. 75/743; 134/3

[58] Field of Search ................... 75/743; 134/3

[56] References Cited

U.S. PATENT DOCUMENTS 5,354,623  10/1994  Hall ......................................... 428/610

Primary Examiner—Melvyn Andrews
Attorney, Agent, or Firm—William G. Lane

[57] ABSTRACT

The process for removing titanium metal and alloys from nickel metal, nickel metal alloys, cobalt metal and cobalt metal alloys by leaching out the titanium metal and/or alloys with a hydrofluoric acid solution, oxidizing $Ti^{+3}$ to $Ti^{+4}$ salts in the leached metals or alloys with an aqueous oxidant, and rinsing the leached metal with water to yield nickel metal, nickel metal alloys, cobalt metal, and/or cobalt metal alloys substantially free of titanium and tin.

19 Claims, 2 Drawing Sheets

METHOD OF RECYCLING NICKEL AND COBALT ALLOY SCRAP METAL CONTAMINATED WITH TITANIUM

FIELD OF THE INVENTION

The present invention is directed to a method of removing titanium and/or titanium alloys from nickel and cobalt alloy Scrap Metals and alloys by leaching with aqueous solutions of hydrofluoric acid.

BACKGROUND OF THE INVENTION

Presently nickel and cobalt metal and alloy scrap turnings contaminated with other free metals or alloys, such as titanium or titanium alloy turnings, are either sold for refiner units, or prepared for recycling by separating the scrap turnings by subjecting them to eddy current magnets, various air classifiers, gravity separators, or centrifuges to separate the nickel and cobalt alloy scrap turnings from the contaminating free metal and alloy turnings by the difference in magnetic properties or the difference in gravity. These types of separators are successful in varying degrees in separating many types of mixed or contaminated metal turning scrap. However, these methods have shown limited success when applied to nickel or cobalt metal and alloy scrap turnings which are contaminated with free titanium metal and titanium alloy turnings. Free titanium metal and alloys i.e., free pieces of metal and alloy that are not alloyed with the primary scrap metal, i.e., nickel metal and alloys and cobalt metal and alloys. These separation processes when employed on nickel or cobalt metal and alloy scrap metals contaminated with free titanium metal or alloy turnings create a middling scrap metal contaminated with titanium metal and/or alloy, and therefore it is unacceptable for recycling to remelt applications. By "unacceptable for recycling to remelt applications", it is meant that the scrap metal cannot be remelted into metals or alloys it originated from. For example, Waspalloy, a nickel alloy, contaminated with free titanium metal and/or alloy cannot be remelted into Waspalloy ingots because of the free titanium contamination. By "free titanium" is meant titanium metal or titanium alloys, such as turnings, solids or grindings, not alloyed with the primary scrap metal alloys, such as Waspalloy nickel alloy. Thus such separations are not economically or technically feasible with respect to nickel or cobalt scrap metal and such nickel and cobalt scrap metal cannot be remelted into nickel and cobalt metal and alloy because they are out of specification with respect to Ti and Sn.

The usual method of separating nickel and cobalt scrap metal in the form of mixed or contaminated solids is by hand sorting by shape and size or by using a Kevex or various sparks tests for positive identification. When the sizes of the pieces of scrap metal are large, this is a practical method. When the pieces become relatively small, such as less than one inch in their greatest dimension, hand sorting is not economical or technically feasible.

Another method of processing contaminated metal grindings and turnings is by melting and refining the metal when it is in the melted state, such as by blowing oxygen into the molten metal in an arc furnace to remove light elements such as aluminum, titanium or lead or refining elements in an AOD vessel. The melting operation also provides a means of removing abrasives from the contaminated grindings. The abrasives, depending upon their density, reporting to the top of the melt or drop to the bottom of the melt. This method is costly, energy intensive and is not successful in removing all metal contaminations, such as tin. Also, there is also a loss of titanium, a valuable metal, and the primary metal which cannot be recaptured because it is oxidized to a metal oxide and becomes bound up in the slag that is formed on the surface of all metal melts. Adding titanium back into the melt after it is lost requires valuable furnace time.

A BRIEF DESCRIPTION OF THE INVENTION

The present invention is directed to a chemical method of cleaning, upgrading and purifying metal and metal alloys not substantially attacked by aqueous HF ("Scrap Metal" herein), such as nickel metal, nickel alloy, such as Inco 718 and Waspalloy, cobalt metal and cobalt alloy, such has Haynes Stellite 25 and 31, by leaching out metal contaminates that are attacked by aqueous HF, such as titanium metal, titanium, and zirconium metal, and the like.

The present invention is directed to a method of purifying Scrap Metal not substantially attacked, i.e., dissolved, by aqueous HF which is contaminated with aqueous HF soluble free metals and alloys, such as Columbian titanium, aluminum, niobium, tungsten, zirconium, vanadium, molybdenum and chromium metals and alloys, comprising the steps of leaching or pickling the Scrap Metal in an aqueous hydrofluoric acid bath to leach out the aqueous HF soluble free metals and alloys from the Scrap Metal, separating the Scrap Metal from the aqueous hydrofluoric acid bath, draining the Scrap Metal, rinsing the separated and drained Scrap Metal with water to remove the residual or carry over aqueous hydrofluoric acid from the Scrap Metal to yield Remelt grade Scrap Metal. By the term "aqueous HF soluble free metals" is meant metals and alloys, such as the ones listed above, which are not alloyed with the Scrap Metal, and which are substantially more soluble in aqueous HF than the Scrap Metals. A metal is substantially more soluble in HF than is Scrap Metal when its dissolution rate on a weight basis is at least ten times greater than the dissolution rate of the Scrap Metal in aqueous HF. Scrap Metal not substantially attacked by aqueous HF includes nickel metal, nickel alloys, cobalt metal, cobalt alloys, iron, iron alloys, such as stainless steel, and the like.

In a preferred embodiment, the Scrap Metal is bagged in porous or open weave bags made of material resistant to hydrofluoric acid and the bagged Scrap Metal is leached in the aqueous hydrofluoric bath.

In another preferred embodiment of the present invention, the separated and drained Scrap Metal recovered from the aqueous hydrofluoric bath is subject to a stop bath prior to being rinsed with water to stop the action of carry over aqueous HF on the Scrap Metal and to oxidize the $Ti^{+3}$ to $Ti^{+4}$, separating the Scrap Metal from stop bath and draining the Scrap Metal prior to being rinsed with water. $Ti^{+3}$ salts are quite insoluble and precipitate out as salts containing F and O adhering to the surface of the Scrap Metal and the contaminating metals, such as free titanium. The $Ti^{+3}$ precipitants adhere strongly to the surface of the metals and are very difficult, if not impossible, to rinse off. When the $Ti^{+3}$ salts are oxidized to $Ti^{+4}$ salts, these latter salts are easily rinsed off the surface of the Scrap Metal in any undissolved contaminated metals.

In another preferred embodiment of the present invention, a portion of the stop bath is recycled into the aqueous hydrofluoric acid bath, the hydrofluoric acid concentration of the hydrofluoric bath is periodically maintained by the addition of makeup fresh aqueous hydrofluoric acid, the concentration of the oxidant in the stop bath is maintained by periodically adding makeup fresh oxidant to the stop bath.

In another preferred embodiment of the present invention, the rinse water from the water rinse is recycled to the stop bath to maintain the titanium concentration of the stop bath below a predefined level.

In another embodiment of the present invention, a portion of the solution from the aqueous hydrofluoric bath is sent to a titanium recovery system which recovers alkali titanium fluoride salts, such as a system employing the method disclosed in U.S. Pat. No. 4,943,419.

In one embodiment of the present invention, the Scrap Metal is nickel Scrap Metal, nickel alloy Scrap Metal, cobalt Scrap Metal, or cobalt alloy Scrap Metal contaminated with titanium metal. In another embodiment of the present invention, the major contaminants in the Scrap Metal are free titanium metal and alloys.

The concentration of the aqueous hydrofluoric acid solution can be between about 1 and about 70% by weight HF, preferably between about 1 and 20% HF, most preferably between about 3 and about 15% HF. All percentages herein are percentages by weight herein. The Scrap Metal is leached for at least about 10 minutes, preferably from about 15 minutes to about 3 hours, and most preferably from about 30 minutes to about 90 minutes. The leach time is dependent upon the temperature of the hydrofluoric acid solution, the concentration of the HF in the aqueous hydrofluoric acid solution, and the minimum dimensions of the metal contaminate solids. The concentration of the HF in the aqueous hydrofluoric acid solution is adjusted to minimize dissolution of the Scrap Metal and maximize the dissolution of the metal contaminants such as free titanium metal and alloys. During the leaching operation, the aqueous hydrofluoric acid bath is maintained in the range of about 10° C. (about 50° F.) to just below the boiling point of the aqueous hydrofluoric bath, preferably between about 15° and about 55° C. (about 60° and 130° F.).

The stop bath can utilize an oxidant that will oxidize the $Ti^{+3}$ salt carry over from the aqueous hydrofluoric acid bath. The stop bath dilutes the carry over from the aqueous hydrofluoric acid bath and slows the HF attack of the Scrap Metal. Nitric acid has been found to be a very suitable stop bath oxidant. The nitric acid can have a concentration in the stop bath from about 1 to about 50% by weight, preferably between about 1 and 20%, and most preferably between about 1 and about 5%. Nickel metal and nickel alloys are somewhat solubilized by nitric acid. Accordingly, it is preferable to maintain the concentration of the nitric acid in the stop bath at the lower end and to carry out the stop bath treatment rapidly to minimize any dissolution of nickel and nickel alloys. For the same reason it is preferable to keep the concentration of nitric acid in the aqueous HF bath low.

DETAILED DESCRIPTION OF THE INVENTION

Figure 1:
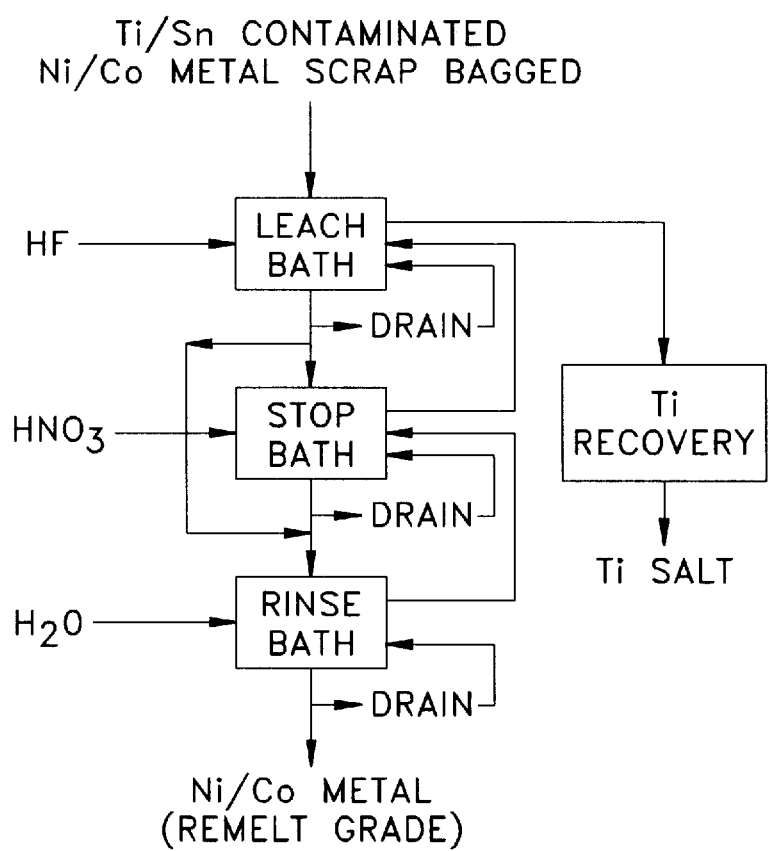
FIG. 1 is a schematic drawing of the processes of the present invention.

The present invention can be employed for any metal that is not appreciably dissolved or leached by aqueous hydrofluoric acid and which is contaminated with titanium metal alloys and/or other metal or alloys which are appreciably leached by the aqueous hydrofluoric acid, such as aluminum, chromium, columbium, molybdenum, niobium, tantalum, titanium, tungsten, vanadium, zirconium metal and alloys, and the like. The method was developed for treating nickel Scrap Metal turnings, nickel alloy scrap turnings, cobalt Scrap Metal turnings and cobalt alloy Scrap Metal turnings contaminated with free titanium metal and/or titanium alloys.

There are a number of ways that the Scrap Metal can be placed in and removed from the various baths employed in the present invention. However, it has been found convenient to take the Scrap Metal and place it in polyethylene or polypropylene bags with an open weave to permit the bath solutions to easily enter and exit the bags and contact the Scrap Metal. The bags must be prepared entirely from material which is resistant to aqueous hydrofluoric acid. The bags can be conveniently made of polyethylene or polypropylene fiber sewed with polypropylene or polyethylene thread. The baths are large enough to receive the bagged Scrap Metal and completely cover it. The aqueous hydrofluoric acid can be heated by steam heaters or other heaters within the bath or the aqueous hydrofluoric acid can be pumped out of the bath through a heat exchanger and back into the bath. Preferably the aqueous hydrofluoric acid is heated above 50° F. to enhance the rate of dissolution and leaching. The attack of HF on refractory metal is highly exothermic and heating can be advoided if there is an appreciable amount of free refractory metal or metal alloy present in the Scrap Metal. The leaching can take place at any temperature between about 50° and just shy of the boiling point of the aqueous hydrofluoric acid. Preferably, the leach bath is maintained at a temperature between about 60° and about 130° F. The bath solution can be agitated with conventional propellers, pumps and the like. However, applicant has found that sufficient agitation is obtained by raising and lowering the bagged Scrap Metal into the bath several times during the aqueous HF leaching operation.

The applicant has found that the easiest way to carry out the present method is to employ a polyethylene tank or PVC lined tank or rubber lined tank supported by a metal or wooden framework on the outside. The tank is constructed deep enough to ensure that the Scrap Metal is fully covered by the bath solution and is long enough to receive a number of bags simultaneously. The bags are preferably supported by a common rack, sling or beam. The size of the tanks are preferably built high enough above the solution of the bath so that the aqueous hydrofluoric bath cannot easily splash over the sides of the bath. Aqueous hydrofluoric acid is a corrosive and dangerous material.

The Scrap Metal is allowed to remain in the aqueous HF bath for sufficient time to dissolve substantially all the free titanium contaminants in the Scrap Metal. By the term "substantially all the free titanium" is meant that the amount, and no more, of titanium and the other elements in the titanium alloy that permit the Scrap Metal to be recycled as remelt, conveniently it means that the Scrap Metal after the leach bath treatment will contain less than 100 parts per million ("PPM" herein) free titanium metal or alloy. It has been found that when substantially all the free titanium is leached out of the Scrap Metal, all other metal contaminants in the titanium alloy leachable by hydrofluoric acid will also have been substantially removed from the Scrap Metal. The Scrap Metal is removed from the leach bath and allowed to drain. This is conveniently carried out when the Scrap Metal is bagged in polyethylene bags by lifting the polyethylene bags out of the leach bath and letting them drain over the surface of the bath until there is virtually no more dripping or drainage. Even after drainage, aqueous HF remains in the bag and Scrap Metal.

The Scrap Metal is optionally, and preferably, placed in a stop bath. When the Scrap Metal is bagged in polyethylene bags, the bags are lowered into the stop bath after drainage following the leach bath treatment is completed. The stop bath is an aqueous oxidant bath which dilutes the aqueous HF carry over, rinses the aqueous HF off the Scrap Metal and oxidizes $Ti^{+3}$ in the Scrap Metal to $Ti^{+4}$. It does not appear that the amount of time that the Scrap Metal remains in the stop bath is overly critical. Five minutes has been found sufficient. The stop bath can be agitated although it has not been found to be necessary. The stop bath is maintained at ambient temperature although it can be at any temperature between about 50° F. to just shy of the boiling point of the aqueous stop bath. However, it has been found that the stop bath works quite well at ambient temperature and no heating or cooling of the bath has been required. After treatment in the stop bath, the Scrap Metal is removed from the stop bath and allowed to drain. This is conveniently carried out when the Scrap Metal has been bagged in polyethylene or polypropylene bags by lifting the bag of Scrap Metal out of the stop bath and allowing it to drain over the surface of the stop bath until the drainage is complete.

The aqueous stop bath contains an oxidant that will oxidize $Ti^{+3}$ to $Ti^{+4}$ under the conditions of the stop bath. Nitric acid has been found to be an excellent oxidant although other oxidants such as peroxides, perchlorates, or oxygen can be used. The concentration of the stop bath when employing nitric acid can be up to 50% by weight nitric acid by weight, preferably between about 1 and about 20% nitric acid by weight, and most preferably between about 1 and about 5% nitric acid by weight. Low concentrations of nitric acid and short treatment times are preferred to minimize dissolution of nickel metal and alloy scrap. During the stop bath treatment or operation, makeup oxidant is added to the stop bath as needed to maintain the nitric acid concentration at an effective concentration, such as between 3 and 15%.

The solution drained off the Scrap Metal after removal from the stop bath is recycled back into the stop bath.

The separated and drained Scrap Metal either from the aqueous hydrofluoric acid bath or from the stop bath, is passed through a rinse bath of water. The rinse operation can be carried out very simply following the stop bath treatment by immersing the Scrap Metal into a water bath. When the stop bath is omitted, the drained Scrap Metal from the leach bath will have adherent $Ti^{+3}$ salt precipitant on its surface which as described above is difficult to remove by rinsing. The stop bath oxidizes the $Ti^{+3}$ salt to $Ti^{+4}$ salt which is easily rinsed off in a rinse bath. The rinse bath can be agitated however, it has not been found necessary. The Scrap Metal is allowed to remain in the rinse bath for a brief time, such as 5 minutes, to dilute and rinse the aqueous stop bath carry over on the bags and Scrap Metal. The rinsed Scrap Metal is removed from the rinse bath and allowed to drain. Conveniently, when the Scrap Metal is bagged as described above, the Scrapped Metal in the bags can be allowed to drain over the surface of the rinse bath until the drainage is complete. If the Scrap Metal is rinsed in another area, the drainage is recycled back into the rinse bath. The rinse bath, because of the high volume of the rinse bath to the small volume of the carry over from the stop bath or aqueous hydrofluoric acid bath substantially cleans the Scrap Metal to yield a remelt grade of Scrap Metals, such as remelt grade of nickel metal, nickel alloy metal, cobalt metal or cobalt alloy metal free of titanium metal, tin metal and other metals leachable by aqueous HF.

Each bath has make up ingredients added to it during the operation. The aqueous hydrofluoric acid bath has concentrated HF added to it at frequent intervals to maintain the level of HF from the bath. The stop bath has concentrated makeup oxidant added to it on a periodic basis to maintain the concentration of the oxidant of the stop bath. Rinse bath solution is removed and water is added to the rinse bath at periodic times to prevent build up of soluble metals, such as titanium and tin, to unacceptable concentrations, As explained above, the drainage from the Scrap Metal following each bath is returned to the appropriate bath.

In the preferred embodiment of the present invention, a portion of the aqueous hydrofluoric bath is removed from time to time in a semi batch process, and all the bath solution in a batch process, to a titanium recovery operation to produce alkali metal titanium fluorides and recover the titanium and fluorine values. A process that works quite well with the hydrofluoric acid bath is the process described in U.S. Pat. No. 4,943,419.

In a continuous operation as material is removed from the aqueous hydrofluoric acid bath to the titanium recovery operation. A portion of the stop bath is removed and cycled to the aqueous hydrofluoric acid bath to make up the volume of the aqueous hydrofluoric acid bath. The concentration of the nitric acid build up in the leach bath must be monitored to keep it very low since nitric acid attacks nickel metal and alloys. Concentrated hydrofluoric acid is added as needed to adjust the hydrofluoric acid concentration in the bath to the desired level. In order to make up the volume of the stop bath, a portion of the rinse bath is cycled to the stop bath and sufficient oxidant is added to the stop bath to maintain the concentration of the oxidant in the stop bath at the desired level. Alternatively, each bath solution can be treated by a means known to the art for disposal. In all instances it may not be possible to treat each bath in order to make it environmentally safe so that it can be disposed of in public treatment systems. However, if the rinse bath and stop bath are cycled back as described above and the aqueous hydrofluoric acid bath is treated for titanium recovery in accordance with U.S. Pat. No. 4,943,419, the process will produce remelt grade Scrap Metal, commercial grade alkali metal titanium fluoride salts and an effluent which is amenable to public treatment systems thus yielding an environmentally safe and sound system for treating Scrap Metals.

EXAMPLE I

Thirty-four thousand ninety pounds of Waspalloy from Utica Alloys, Inc., Utica, N.Y. which was reduced in a hammer mill and found to be contaminated with free Ti-17 alloy turnings (titanium/tin alloy).

About 14,400 pounds of the same material was received from Ireland Alloys, Inc. of Houston, Tex.

The titanium and tin contaminated Waspalloy is normally sold to nickel and cobalt reclaimers, such as Falconbridge. The alloy receives a value of about $2.25 per pound in current (November, 1996) conditions. The other alloy ingredients are of no value and in many instances are detrimental for reclaiming. The removal of titanium and the tin from the Waspalloy yields a purified Waspalloy which may be remelted into Waspalloy ingots and has a value of about $4 per pound. Thus the removal of free titanium metal and alloy from Waspalloy increases the value of the Waspalloy scrap material from about $2.25 per pound up to $4 per pound.

EXAMPLE II

It is not uncommon to find contaminated Waspalloy contaminated with free titanium metal and alloy. The titanium content is in the order of 3% by weight and the tin content is less than 0.002% by weight. However, when Waspalloy turnings are contaminated with free Ti-17 alloy turnings, the tin content rises to about 0.022%. The analysis for Ti-17 alloy, pure Waspalloy, and the analysis in weight percent of the contaminated Waspalloy from Utica Alloys, Inc. is as follows in Table 1.

TABLE 1

|    | Ti-17 | Waspalloy | Utica Alloys' Analysis of Contaminated Scrap |
|----|-------|-----------|---------------------------------------------|
| Ni | 0.0   | 58.0      | 57.0                                        |
| Ti | 80.0  | 3.0       | 4.08                                        |
| Sn | 2.0   | <0.0020   | 0.0221                                      |

The 40,000 pounds of contaminated Waspalloy from Utica Alloys, Inc. based on the above analysis contained about 354 pounds of titanium and 8.84 pounds of tin. This material had to be removed to yield remelt grade Waspalloy. The aqueous hydrofluoric acid leach bath employed in Example III below contains about 360 gallons of aqueous hydrofluoric acid. Assuming the baths employed during the entire leaching operation at 360 gallons and would have make up a hydrofluoric acid, the final titanium content of the bath after the leaching of the 40,000 pounds of alloy would be 121 grams per liter of titanium and 2.94 grams per liter of tin in the aqueous hydrofluoric acid of the bath.

The nickel in the Waspalloy dissolves much slower in the aqueous hydrofluoric acid than the titanium and the alloy. After 3,000 pounds of the Waspalloy were leached in the aqueous hydrofluoric acid leach bath, the hydrofluoric acid solution contained about 8 grams of titanium per liter and about 0.8 grams of nickel per liter. Thus, the dissolution rate of titanium is about 150 times that of nickel.

The leaching is carried with more than a stoichiometric amount of hydrofluoric acid for the titanium, tin, molybdenum, and chromium in the Ti-17 alloy. About 20% over stoichiometric has been found adequate. Assuming the free titanium content of 0.884% in 40,000 pounds of Waspalloy, 709 pounds of HF (1,013.5 pounds of 70% HF) is sufficient to dissolve the titanium and other HF dissoluble metals out of the Waspalloy.

The preliminary lab tests showed that the Ti-17 alloy could be removed from the Waspalloy in about 30 to 90 minutes at ambient temperature (95° F.). The higher the concentration of HF and the higher the temperature, the shorter the time required. The chips of Waspalloy and the Ti-17 alloy on the order of 40 mls. thick. If the dissolution rate of the metal in aqueous hydrofluoric acid solution is about 1 mil per minute, it is calculated that the leaching should be completed in about 40 minutes. In other words the chips of Ti-17 alloy should be dissolved in 40 minutes assuming the thickness is 40 mil.

The Waspalloy scrap turnings were placed in uncoated polyethylene fabric SUPERSAK bags with polyethylene stitching. The tanks of the baths measured two feet by two feet by sixteen feet in length and the sacks were 17"×17"×17" which expanded to a 21½" diameter when filled with the Waspalloy Scrap Metal. Each bag contained about 125 pounds of Waspalloy scrap turnings. The bags were not completely filled in order that the bag could be fully immersed and submerged into the aqueous hydrofluoric acid in the leach bath. Eight bags were mounted on a longitudinal rack so that all 8 bags could be lowered into the 16' long bath at one time. The bags were reused several times without any noticeable deterioration from the hydrofluoric acid treatment. During the leaching operation, the bags of Waspalloy were raised out of and then lowered back into the bath periodically to ensure fresh acid reached the Ti-17 alloy pieces in the bag.

During the operation, the bags were treated in the aqueous hydrofluoric acid for periods of from 1½ to 4 hours to determine if there was any difference in titanium dissolution. None was observed. After the bags had remained in the aqueous hydrofluoric acid for the specified time, the bags were raised out of the acid baths and allowed to drain until drainage was complete. The bags were then moved by an overhead crane to an adjoining stop bath containing nitric acid. The bags were lowered in the nitric acid solution and allowed to remain in the stop bath for several minutes. The bags were then raised out of the stop bath and allowed to drain until drainage was complete. The drained bags were then moved to the water rinse bath and lowered into the water rinse bath for a couple of minutes. The bags were raised out of the rinse bath and allowed to drain and then set on pallets to drain completely. After draining, some of the leached Waspalloy was put into Gaylord's, some into 55 gallon drums, and the balance was left in the SUPERSAK bags.

The aqueous hydrofluoric acid contained 285 pounds of HF per 360 gallons of leach bath solution giving a concentration of about 8 weight %. After 3,000 pounds of scrap Waspalloy was acid leached, makeup hydrofluoric acid was added to the hydrofluoric acid bath. Ninety-three pounds of HF were added as a 70% HF solution after each 3,000 pounds of Waspalloy were acid leached. The stop bath was 360 gallons and contained 150 pounds of HNO3 to give a concentration of 3½ weight % nitric acid. After 30,000 pounds of scrap Waspalloy have been treated, an additional 87.5 pounds of nitric acid as an aqueous solution (15 gallons) was added to the stop bath.

Each 1,000 pound batch of scrap Waspalloy that was treated in the aqueous hydrofluoric acid solution added 8.84 pounds of titanium and 0.221 pounds of tin to the aqueous hydrofluoric acid solution bath. Each transfer of scrap Waspalloy from the aqueous hydrofluoric acid bath to the stop bath transferred about 5% by weight of the working fluid, aqueous HF, to the stop bath, in other words, about 6 gallons of aqueous hydrofluoric acid solution remained in or on the bags and Scrap Metal after drainage.

The concentration of nickel, titanium, tin and fluorine of the various baths at the completion of the treatment of the 40,000 pounds of scrap Waspalloy was analyzed as set forth in Table 2.

TABLE 2

| Bath              | Ni      | Ti      | Sn      | F        |
|-------------------|---------|---------|---------|----------|
| Working (360 gal) | 4.5 lb. | 185 lb. | 2.5 lb. | 659 lb.  |
| Stop (360 gal)    | 5.1 lb. | 121 lb. | 3.1 lb. | 457 lb.  |
| Rinse (360 gal)   | 9.1 lb. | 129 lb. | 3.1 lb. | 601 lb.  |
| Total             | 18.71 lb. | 435 lb. | 8.7 lb. | 1717 lb. |

After half of the scrap Waspalloy (20,000 pounds) had been treated, a sample of the leached product was rinsed in 5% nitric acid solution to determine how much titanium and tin metal were present on the surface of the scrap Waspalloy as dried salts following the water rinse in the rinse bath. The results are set forth in Table 3.

TABLE 3

| Product | Ni | Ti | Sn |
| --- | --- | --- | --- |
| Utica 16076 | 135 ppm | 34 ppm | ND |
| Ireland | 2963 ppm | 1676 ppm | 12 ppm |

The resulting product after being acid leached, treated in the stop bath and rinsed with water in the rinse bath, was in conformity with the requirements for remelt Waspalloy if the treatment brought the amount of titanium and tin in the Waspalloy down to specs.

If desired, the bagged treated scrap Waspalloy can be dried prior to shipment or transported as wet product and dried by the ultimate user prior to remelting.

EXAMPLE III

Figure 2:
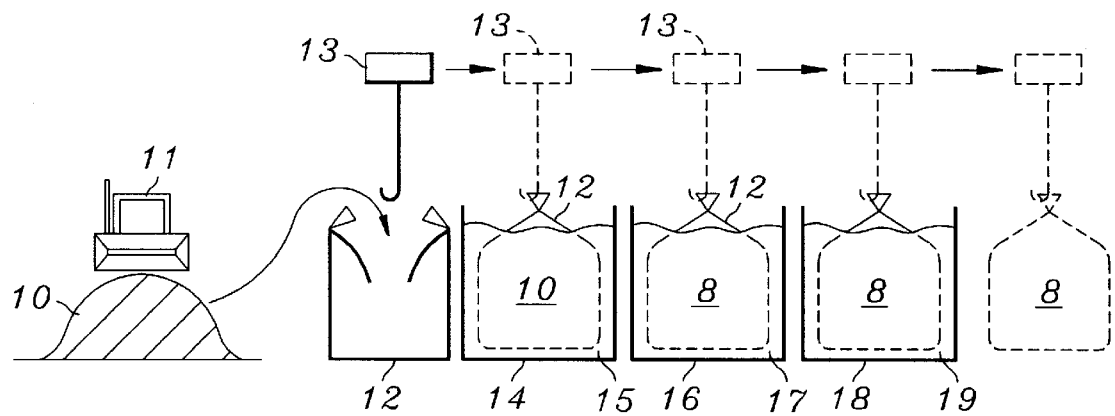
FIG. 2 is a schematic drawing of one embodiment of the present invention.

Referring to FIG. 2, mixed Scrap Metal contaminated with titanium metal and titanium alloy (mixed scrap) is shoveled with a loader 11 into a polyethylene bag 12. Overhead crane 13 lifts bag 12 holding the mixed scrap 10 and lowers it into leach tank 14 containing a solution of aqueous HF 15 (from about 6 to about 10% by weight HF). The bag 12 containing the mixed scrap 10 remains in the solution 15 until the Ti-17 alloy scrap has dissolved. The bag and the Scrap Metal 8 are then lifted by crane 13 from solution 15 and held above the leach tank 14 while the excess solution 15 drains back into tank 14. The bag now contains only Scrap Metal 8 free of titanium and tin and substantially free of residual aqueous hydrofluoric acid solution 15. It is moved by crane 13 and lowered into tank 16 containing a stop bath solution of aqueous nitric acid 17 (from about 5% to about 10% by weight nitric acid). The stop bath solution 17 halts the reaction of carry over aqueous hydrofluoric acid with the Scrap Metal 8. The bag 12 and the Scrap Metal 8 remain in the stop bath tank 16 until the stop bath solution 17 has thoroughly saturated the Scrap Metal. The bag with the Scrap Metal is lifted by crane 13 from the stop bath solution 17 and held above tank 16 while the excess stop bath solution 17 drains from the Scrap Metal back into tank 16. The bag with the Scrap Metal alloy and the residual or carry over solution 17 from tank 16 are moved by crane 13 and lowered into rinse tank 18 containing a water rinse 17.

The bag and Scrap Metal are left in the water rinse for a few minutes to fully dilute any residual solution 17 from tank 16. The bag and the Scrap Metal 8 are then lifted by crane 13 out of the water rinse 17 and held above tank 18 while the bag and the Scrap Metal drain. The Scrap Metal 8 can then be transported, stored. The Scrap Metal 8 is dried before it is reused in remelt.

The Scrap Metal can be Waspalloy scrap, Inco 718 nickel scrap or any other nickel or cobalt metal alloy scrap. The bags or containers that are used to hold the Scrap Metal during treatment in the aqueous hydrofluoric acid leach solution, the nitric acid stop bath and the water rinse are made of a material that is not attacked by the aqueous hydrofluoric acid and aqueous nitric acids and that is porous and permits migration of solutions into the bag and drainage out of.

The concentration of aqueous hydrofluoric acid and nitric acid in the leach bath 14 and the stop bath 16 can vary outside the range of from about 5 to about 10% by weight as described above.

EXAMPLE IV

Figure 3:
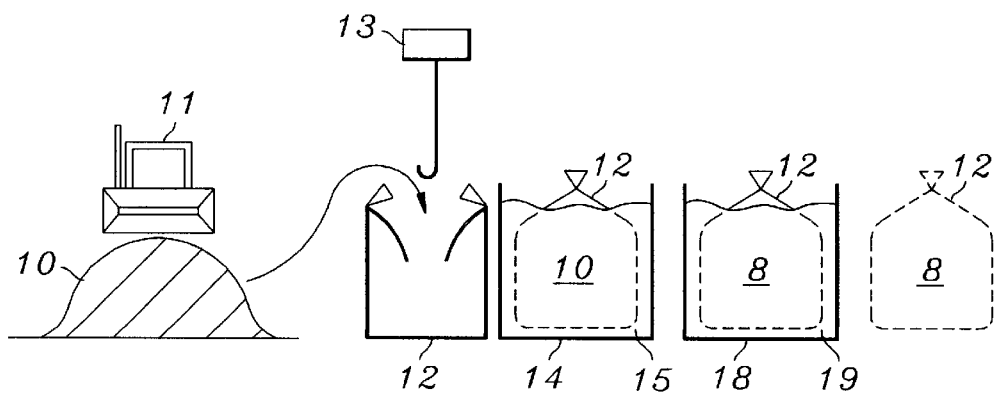
FIG. 3 is a schematic drawing of a second embodiment of the present invention.

According to FIG. 3, mixed Scrap Metal contaminated with Ti-17 alloy (titanium and tin metal alloy) (mixed scrap) is shoveled with loader 11 into polyethylene bag 12. Overhead crane 13 lifts bag 12 holding the mixed scrap 10 and lowers it into leach tank 14 containing a solution of aqueous HF 15 (from about 6 to about 10% by weight HF). The bag 12 containing the mixed scrap 10 remains in the solution until the Ti-17 alloy scrap has dissolved. The bag and the Scrap Metal 8 are then lifted by crane 13 from solution 15 and held above the leach tank 14 while the excess solution 15 drains back into tank 14. The bag now contains only Scrap Metal 8 free of titanium and tin and substantially free of residual aqueous hydrofluoric acid solution 15. The bag and its contents are moved by crane 13 and lowered into rinse tank 18 containing a water rinse 17. The bag and the Scrap Metal are left in the water rinse for a few minutes to fully dilute any residual solution 14 from tank 14. The bag and the Scrap Metal 8 are then lifted by crane 13 out of the water rinse 17 and held above the tank while the bag and the Scrap Metal drain. The Scrap Metal 8 can then be transported, stored and/or dried. The Scrap Metal 8 is dried before it is reused in remelt.

We claim:

1. A method of purifying Scrap Metals and Alloys not substantially attacked by aqueous HF contaminated with HF soluble free metals and alloys comprising the steps of:

leaching the Scrap Metals and Alloys not substantially attacked by aqueous HF contaminated with HF soluble free metals with aqueous hydrofluoric acid to dissolve the HF soluble free metals and alloys leaving leached Scrap Metals and Alloys not substantially attacked by aqueous HF;

draining the leached Scrap Metals and Alloys not substantially attacked by aqueous HF to separate the aqueous hydrofluoric acid therefrom;

treating the drained Scrap Metals and Alloys not substantially attacked by aqueous HF with a stop bath of aqueous oxidant;

draining the leached Scrap Metals and Alloys not substantially attacked by aqueous HF to separate the stop bath therefrom; and rinsing the drained Scrap Metals and Alloys not substantially attacked by aqueous HF with water to remove a substantial portion of the stop bath of aqueous oxidant therefrom.

2. The method according to claim 1 wherein the Scrap Metals and Alloys are nickel metal, nickel alloy, cobalt metal or cobalt alloy.

3. The method according to claim 1 wherein the HF soluble free metals and alloys are free titanium metal and titanium alloy.

4. The method according to claim 2 wherein the aqueous hydrofluoric acid contains from about 2 to about 70% HF.

5. The method according to claim 2 wherein the aqueous hydrofluoric acid contains from about 6 to about 10% HF.

6. The method according to claim 5 wherein the leaching time of the Scrap Metals and Alloys in the aqueous hydrofluoric acid is from about 30 minutes to about 90 minutes.

7. The method of claim 1 wherein the temperature of the aqueous hydrofluoric acid solution is maintained between about 60° and 130° F.

8. The method according to claim 2 wherein the stop bath is an aqueous nitric acid stop bath.

9. The method according to claim 8 wherein the stop bath contains from about 2 to about 50% by weight nitric acid.

10. The method according to claim 9 wherein the stop bath contains from about 1 to about 5% by weight nitric acid.

11. The method according to claim 1 wherein the separated aqueous hydrofluoric acid drained from the Scrap Metals and Alloys not substantially attacked by aqueous HF is recycled to the aqueous hydrofluoric bath.

12. The process according to claim 1 wherein the separated stop bath drained from the Scrap Metals and Alloys not substantial attacked by aqueous HF is recycled to the stop bath.

13. The process according to claim 1 wherein the Scrap Metals and Alloys not substantially attacked by aqueous HF is drained after rinsing with water to separate the water from the Scrap Metals and Alloys and the separated water is recycled to the rinse bath.

14. The process according to claim 3 wherein the separated aqueous hydrofluoric acid solution is separately treated to recover the titanium values and fluorine values from the solution.

15. The method according to claim 1 wherein the concentration of the HF in the aqueous hydrofluoric acid used in leaching the Scrap Metals and Alloys is maintained within a predetermined range by the addition of HF.

16. The method according to claim 2 wherein the concentration of the aqueous oxidant in the stop bath is maintained within a predetermined range by the addition of makeup oxidant to the stop bath.

17. The method according to claim 2 wherein the aqueous oxidant is an aqueous peroxide solution.

18. The method according to claim 2 wherein the aqueous oxidant is an aqueous acidic solution saturated with $O_2$.

19. The process according to claim 2 wherein the aqueous oxidant solution is a perchlorate solution.

* * * * *